United States Patent [19]

Behringer et al.

[11] 4,454,067

[45] Jun. 12, 1984

[54] CONTINUOUS PRODUCTION OF AZO PIGMENTS

[75] Inventors: Hartmut Behringer; Kurt Karrenbauer, both of Erftstadt; Heinrich Rehberg, Hürth-Hermülheim, all of Fed. Rep. of Germany

[73] Assignee: Hoechst Aktiengesellschaft, Fed. Rep. of Germany

[21] Appl. No.: 82,977

[22] Filed: Oct. 9, 1979

[30] Foreign Application Priority Data

Oct. 13, 1978 [DE] Fed. Rep. of Germany ....... 2844634

[51] Int. Cl.$^3$ .............................................. C09B 41/00
[52] U.S. Cl. ................................... 260/176; 260/144; 260/193; 260/197
[58] Field of Search .................... 260/144 P, 176, 193, 260/197

[56] References Cited

U.S. PATENT DOCUMENTS 4,159,264  6/1979  Hamilton et al. ............ 260/144 P X
4,190,578  2/1980  Hamilton et al. ............ 260/144 P X

FOREIGN PATENT DOCUMENTS 1085278   7/1960  Fed. Rep. of Germany .
1644117  10/1970  Fed. Rep. of Germany ...... 260/174
1934388   3/1971  Fed. Rep. of Germany ... 260/144 P
77985    12/1970  German Democratic Rep. ................... 260/144 P
1143727   2/1969  United Kingdom ................ 260/174

*Primary Examiner*—Thomas A. Waltz
*Attorney, Agent, or Firm*—Connolly and Hutz

[57] ABSTRACT

The invention relates to a process for the continuous manufacture of azo pigments, wherein a coupling component is reacted, inside a reaction zone filled with a previously produced suspension of the azo pigment to be made, with an aqueous solution of a diazo component at 10° to 60° C. and over periods of 0.2 to 4 hours. To this end, an aqueous suspension or solution of the coupling component is passed in substantially laminar flow upwardly through a cylindrical reaction zone arranged in upright position; the aqueous solution of the diazo component is introduced through 2 to 50 serially arranged inlets opening laterally into the reaction zone, the diazo component being admitted in quantities decreasing from below to above and the stoichiometric end point of the coupling reaction being established at the upper most inlet opening into the reaction zone; the pH-value typical of each reaction is established by introducing dilute alkali liquor through 2 to 50 serially arranged inlets opening laterally into the reaction zone, the respective diazo component and alkali liquor inlets being arranged at different levels with respect to each other.

5 Claims, 1 Drawing Figure

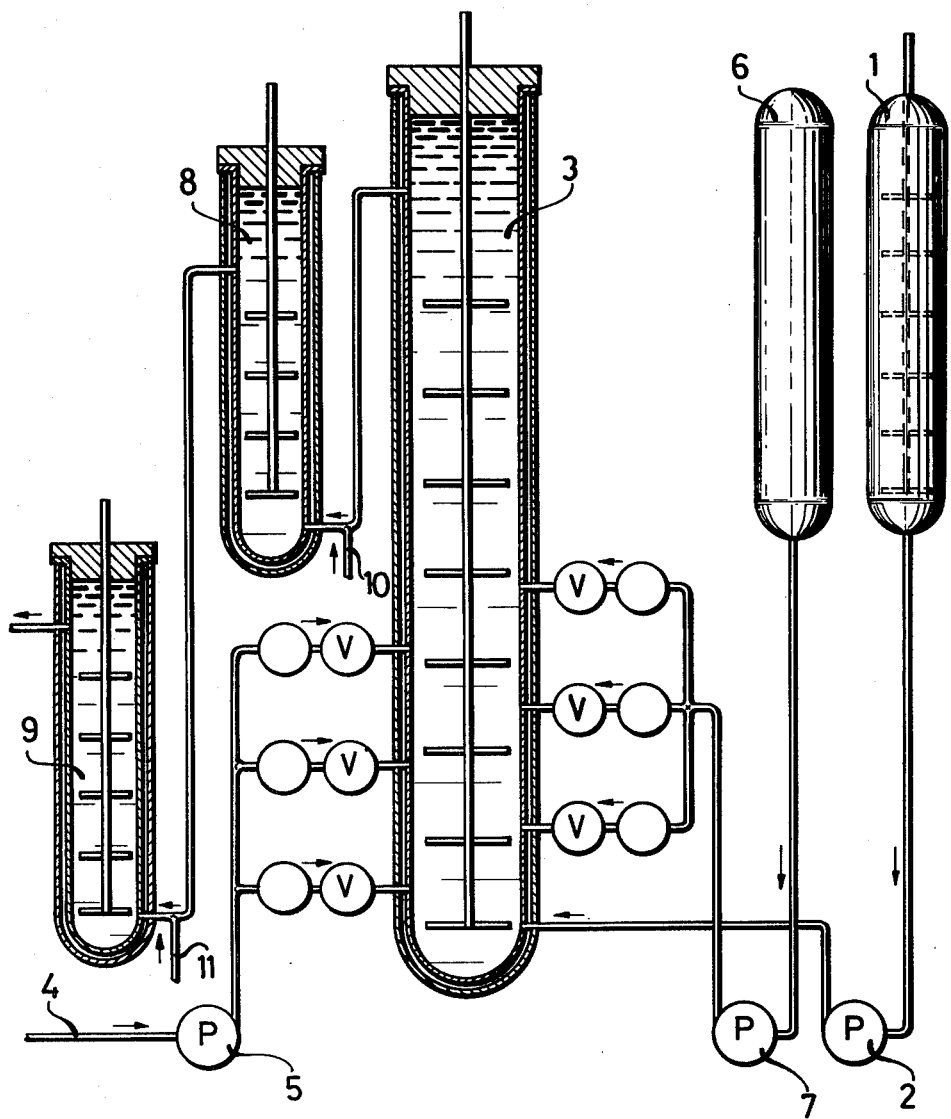

CONTINUOUS PRODUCTION OF AZO PIGMENTS

The present invention relates to a process for the continuous manufacture of azo pigments, wherein a coupling component is reacted, inside a reaction zone being filled with a previously produced suspension of the azo pigment to be made, with an aqueous solution of a diazo component at temperatures of 10° to 60° C. and over periods of 0.2 to 4 hours, if desired in the presence of customary addends, which comprises: passing an aqueous suspension or solution of the coupling components in substantially laminar flow upwardly through a cylindrical reaction zone arranged in upright position; introducing the aqueous solution of the diazo component through 2 to 50, preferably 3 to 10, serially arranged inlets, i.e. with one downstream of another, opening laterally into the reaction zone, the diazo component being admitted in quantities decreasing from below to above and the stoichiometric end point of the coupling reaction being established at the uppermost inlet opening into the reaction zone; and establishing the pH-value typical of each reaction by introducing dilute alkali liquor through 2 to 50, preferably 3 to 10, serially arranged inlets i.e. with one downstream of another, opening laterally into the reaction zone, the respective diazo component and alkali liquor inlets being arranged at different levels with respect to each other.

Water-insoluble azo pigments find widespread uses for coloring lacquers and varnishes, plastics materials and in the printing ink industries Processes for the continuous manufacture of azo pigments wherein the coupling component is dissolved in an alkali liquor and the resulting solution is reacted with an always acid solution of the diazo component (diazonium salt solution) have already been described in German Patent No. 1 085 278 and German Patent Specification "Offenlegungsschrift" No. 1 644 117.

In the process described in German Pat. No. 1 085 278, the two solutions are admitted to a reaction system having a previously coupled dyestuff suspension placed therein, of which considerable quantities are circulated by means of a pump. In the process described in German Patent Specification "Offenlegungsschrift" No. 1 644 117, the two reactants are admitted to a mixing nozzle and finely mixed therein.

An adverse effect which is common to the two processes just described resides in the fact that the entire reaction is carried out under end point conditions. This means in other words that even minor inaccuracies in the metered supply of the reactants may well produce an excess of diazonium salt in the reaction mixture, which is liable adversely to affect the quality of the resulting azo pigment.

In addition to this, the process described in German Patent Specification "Offenlegungsschrift" No. 1 644 117 provides for the alkaline solution of the coupling component to be directly mixed with the acid diazonium salt solution. As a result, it is just possible to maintain the pH-value constant within rather wide limits only, which is disadvantageous as the pH-value is generally known in the art considerably to determine the quality of the resulting azo pigment. A disadvantage associated with the process described in German Pat. No. 1 085 278 resides in the need to circulate considerable quantities of dyestuff suspension.

Preferred optional features of the present invention provide:
(a) for the azo pigment suspension to be delivered from the reaction zone to a heatable sojourn zone or a plurality of serially arranged sojourn zones and for it to be stirred therein at temperatures within the range 20° to 100° C. over a total period of 0.2 to 5 hours;
(b) for the customary addends to be metered into the solution or suspension of the coupling component and/or the azo pigment suspension coming from the reaction zone. The customary addends comprise wetting agents, dispersants, and emulsifiers capable of modifying the properties of the resulting azo pigment.

The coupling operation to obtain the azo pigments should preferably be carried out at temperatures within the range 15° to 40° C.

The process of this invention will now be described with reference to the flow scheme and exemplary apparatus shown diagrammatically in the accompanying drawing.

Placed in a stirring vessel (1) is the coupling component suspended in water with or without addends therein. It is generally good practice to suspend the coupling component in water, dissolve it by the addition of NaOH of about 25% strength with agitation, and reprecipitate it by means of an acid. In this manner, it is possible to obtain very fine-particulate starting material for use in the coupling operation and, at the same time, to establish the pH-value desirable for the coupling operation.

By means of a dosing pump (2), the suspension is continuously introduced into the base portion of a cylindrical coupling reactor (3). Diazonium salt solution flowing through a conduit (4) is introduced by means of a dosing pump (5) into the reactor (3) through 2 to 50 (3 in the embodiment shown) serially arranged inlets opening laterally thereinto, the flow of material through the three inlets shown in the accompanying flow scheme being controlled so as to ensure the presence of an excess of coupling component at the lowermost and middle inlets. The reaction velocity inside the reactor (3) decreases from below the above. The diazonium salt solution is also admitted to the reactor (3) in quantities decreasing from the lowermost to uppermost inlets. Admitted through the uppermost inlet is a minimum quantity of diazonium salt, i.e. the quantity just necessary for reaching the stoichiometric end point (equivalence point) of the coupling reaction. The end point is determined by customary methods, e.g. the spot method or potential test method described, e.g. in German Pat. No. 1 085 278. It is also possible for the minimum quantity of diazonium salt which is to be admitted through the uppermost inlet to be automatically controlled by means of the metered potential.

In order to have a defined pH-value inside the reactor (3), an alkali liquor, preferably sodium hydroxide solution coming from a reservoir (6) is introduced thereinto by means of a dosing pump (7). The alkali liquor is introduced into the reactor exactly the same way as the diazonium salt, i.e. through 2 to 50 (3 in the embodiment shown) serially arranged inlets opening laterally into the reactor (3), the respective diazonium salt solution inlets and alkali liquor inlets being preferably arranged opposite to each other but always at different levels with respect to each other. The quantity of alkali liquor to be admitted can be automatically controlled by means of the pH-value. The pH-value itself which is to be established does not form part of this invention. The optimum pH-range is variable in accordance with the particular coupling component used. A very wide variety of coupling operations together with the relevant pH-ranges have incidentally been described in the art.

The coupling reactor (3) is provided with a double jacket permitting it to be heated or cooled. In addition to this, the reactor (3) is equipped with a stirrer which is designed so as to produce a good stirring effect in the plane perpendicular with respect to the axis of agitation, but no particular stirring effect in the direction of the axis of agitation or axis of the cylindrical coupling reactor. As a result of this, the flow of the reaction mixture from below to above through the reactor remains substantially unaffected, and the reaction mixture remains therein over a defined period of time.

The coupling reactor may be series-connected to one or more containers as shown, e.g. at (8) and (9). It is possible for these containers to be provided with an agitator of the type used in the coupling reactor (3) and/or with a double jacket permitting them to be heated or cooled. The pigment which is delivered to these container(s) may be further stirred or heated therein.

The coupling reactor and container(s) downstream thereof are all fitted with flanges so that it is possible for them to be made longer or shorter with the use of a suitable adapter or connection. In this way, it is possible to modify the residence time of the reactants in the coupling reactor and conform it to the reaction velocity of the particular coupling operation, and also to vary, in the serially arranged containers, the stirring and heating periods.

Conduits (10) and/or (11) are used for admixing the azo pigment with a suitable addend.

EXAMPLE 1:

Preparation of α-(2'-nitro-4'-methyl-phenylazo)-acetoacetic acid phenylamide of the formula:

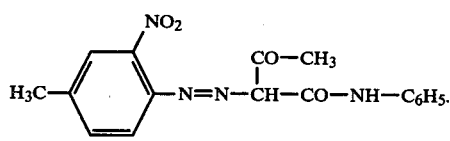

1.350 l of water, 8 ml of an 8 weight % aqueous solution of dibutylated naphthalene sulfonate addend (LEONIL DB; this is a registered Trade Mark of Hoechst Aktiengesellschaft, Frankfurt (M), Federal Republic of Germany) and 354 g (2 mols) of N-acetoacetylaniline of the formula $CH_3COCH_2CONH-C_6H_5$ were placed in a 5 l-beaker and stirred therein to give a suspension. By the addition of 76 ml of NaOH of 25% strength, the N-acetoacetylaniline was dissolved with agitation and then reprecipitated with the use of 36 ml of glacial acetic acid. Next, a pH of 6 was established, the suspension was placed in the stirring vessel (1) and then continuously pumped within 1 hour into the coupling reactor (3), which was filled with a previously produced suspension of the azo pigment to be made. The diazonium salt solution of diazotized 3-nitro-4-amino-toluene travelling through conduit (4) was introduced through three inlets. 60% of the overall quantity (2 mols) of diazonium salt was introduced through the lowermost inlet, 30% through the middle inlet and 10% through the uppermost inlet so as to have a slight excess of diazonium salt at the uppermost inlet but none at the middle inlet and lowermost inlet.

A temperature of 38° C. was maintained in the coupling reactor in which a pH of 4.2 was established by means of NaOH of 5% strength coming from the reservoir (6). It was introduced into the coupling reactor (3) through the three inlets shown in the drawing. The azo pigment obtained (2 mols) was continuously taken in the form of an aqueous suspension from the head of the coupling reactor (3), which had no further container series-connected thereto. It was worked up and dried as usual. The coloristic properties of the azo pigment were found to be fully reproducible in coloristic tests made on several parallel batches.

EXAMPLE 2

Preparation of α-(2'-nitro-4'-chloro-phenylazo)-acetoacetic acid-2-chloro-phenylamide of the following formula:

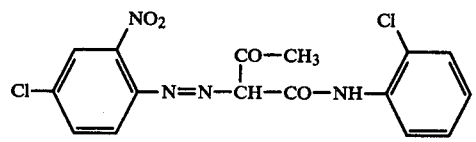

211 g (1 mol) of N-acetoacetyl-o-chloraniline and 1.550 l of water were placed in a 5 l-beaker and stirred therein to give a suspension. Next, the N-acetoacetyl-o-chloraniline was dissolved by the addition of 43 ml of NaOH of 25% strength and reprecipitated by means of 25 ml of glacial acetic acid. A pH-value of 5.5 was established and the suspension was initially placed in stirring vessel (1). Next, it was continuously pumped within 30 minutes into the coupling reactor (3) filled with a previously produced suspension of the azo pigment to be made. The diazonium salt solution of diazotized 4-chloro-2-nitraniline (1 mol) travelling through conduit (4) was admitted through three inlets. The other conditions were as described in Example 1.

A temperature of 28° C. was maintained in the coupling reactor and a pH of 4.5 was maintained by means of NaOH.

1 mol of azo pigment was obtained of which the colorstic properties were found to be fully reproducible in coloristic tests made on several parallel batches.

EXAMPLE 3

Preparation of 3,3'-dichloro-4,4'-bis[azo-α-(1"-acetoacetylamino)-4"-chloro-2",5"-dimethoxybenzene]-diphenyl of the formula

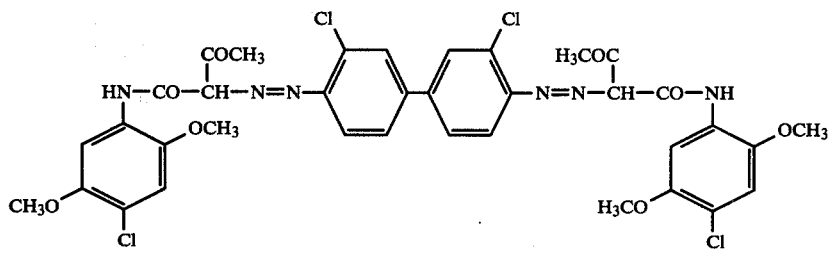

420 g (2,2 mols) of 1-acetoacetylamino-4-chloro-2,5-dimethoxybenzene was dissolved in a mixture of 1.600 l of water and 219 ml of NaOH of 25% strength, in a 5 l-beaker. Next, the solution was added within 30 minutes to a mixture of 275 ml of water, 250 g of ice and 115 ml of glacial acetic acid. The suspension so obtained was initially placed in stirring vessel (1) and then continuously pumped within 1 hour into the coupling reactor (3) filled with a previously produced suspension of the azo pigment to be made. The diazonium salt solution of diazotized 3,3'-dichlorobenzidine of the formula:

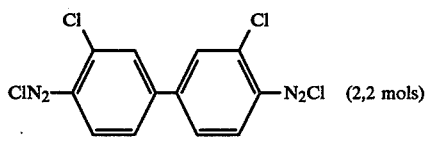

coming from conduit (4) was introduced through three inlets into the coupling reactor (3) in which a pH of 4.5 was maintained by means of NaOH. The temperature inside the coupling reactor was 30° C. The other conditions were as in Example 1.

The azo pigment suspension obtained was heated in container (8) to 50° C. by supplying heat through the jacket, and in container (9) to 80° C. Next, it was admixed through line (10) with 300 ml/h of an aqueous resin soap solution as an addend. 2.2 mols of azo pigment which had the predetermined coloristic properties was obtained. They were found to be fully reproducible in a series of coloristic tests made on several parallel batches.

EXAMPLE 4

Preparation of 1-(2'-nitro-4'-methyl-phenylazo)-2-hydroxynaphthalene of the formula

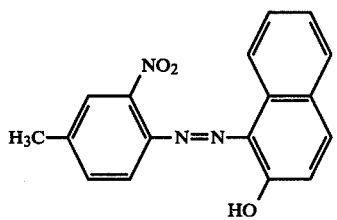

144 g (1 mol) of β-naphthol was dissolved in 750 ml of water and 140 ml of NaOH of 25% strength. Next, the solution was added within 10 minutes to a mixture of 1.0 l of water, 105 ml of hydrochloric acid of 30% strength, 15 ml of phosphoric acid of 80% strength and 450 g of ice. The suspension so obtained was initially placed in stirring vessel (1) and then continuously pumped into the coupling reactor (3) filled with a previously produced suspension of the azo pigment to be made. The diazonium salt solution of diazotized 3-nitro-4-amino-toluene (1 mol) flowing through conduit (4) was introduced through three inlets into the coupling reactor (3) in which a pH of about 7 was maintained by means of NaOH. The temperature inside the reactor was 28° C. The other conditions were as described in Example 1.

The azo pigment obtained (1 mol) was continuously taken in the form of an aqueous suspension from the head of the coupling reactor which had no further container connected thereto. The suspension was worked up and dried as usual. The coloristic properties of the azo pigment were found to be fully reproducible in a series of coloristic tests made on several parallel batches.

We claim:

1. A process for the continuous manufacture of azo pigments, wherein a coupling component is reacted, inside a reaction zone being filled with a previously produced suspension of the azo pigment to be made, with an aqueous solution of a diazo component at temperatures of 10° to 60° C. and over periods of 0.2 to 4 hours, if desired in the presence of customary addends, which comprises: passing an aqueous suspension of the coupling component in substantially laminar flow upwardly through a cylindrical reaction zone arranged in upright position; introducing the aqueous solution of the diazo component through 2 to 50 serially arranged inlets opening laterally into the reaction zone, the diazo component being admitted in quantities decreasing from below to above and the stoichiometric end point of the coupling reaction being established at the uppermost inlet opening into the reaction zone; and establishing the pH-value typical of each reaction by introducing dilute alkali liquor through 2 to 50 serially arranged inlets opening laterally into the reaction zone, the respective diazo component and alkali liquor inlets being arranged at different levels with respect to each other.

2. A process as claimed in claim 1, wherein the azo pigment suspension is delivered from the reaction zone to a heatable sojourn zone or a plurality of serially arranged sojourn zones, and stirred therein at temperatures within the range 20° to 100° C. over a total period of 0.2 to 5 hours.

3. A process as claimed in claim 1, wherein the customary addends are metered into the suspension of the coupling component and/or the azo pigment suspension coming from the reaction zone.

4. A process as claimed in claim 1, wherein the aqueous solution of the diazo component is introduced into the reaction zone through 3 to 10 serially arranged inlets opening laterally thereinto.

5. A process as claimed in claim 1, wherein the dilute alkali liquor is introduced into the reaction zone through 3 to 10 serially arranged inlets opening laterally thereinto.

* * * * *